Patented Oct. 2, 1934

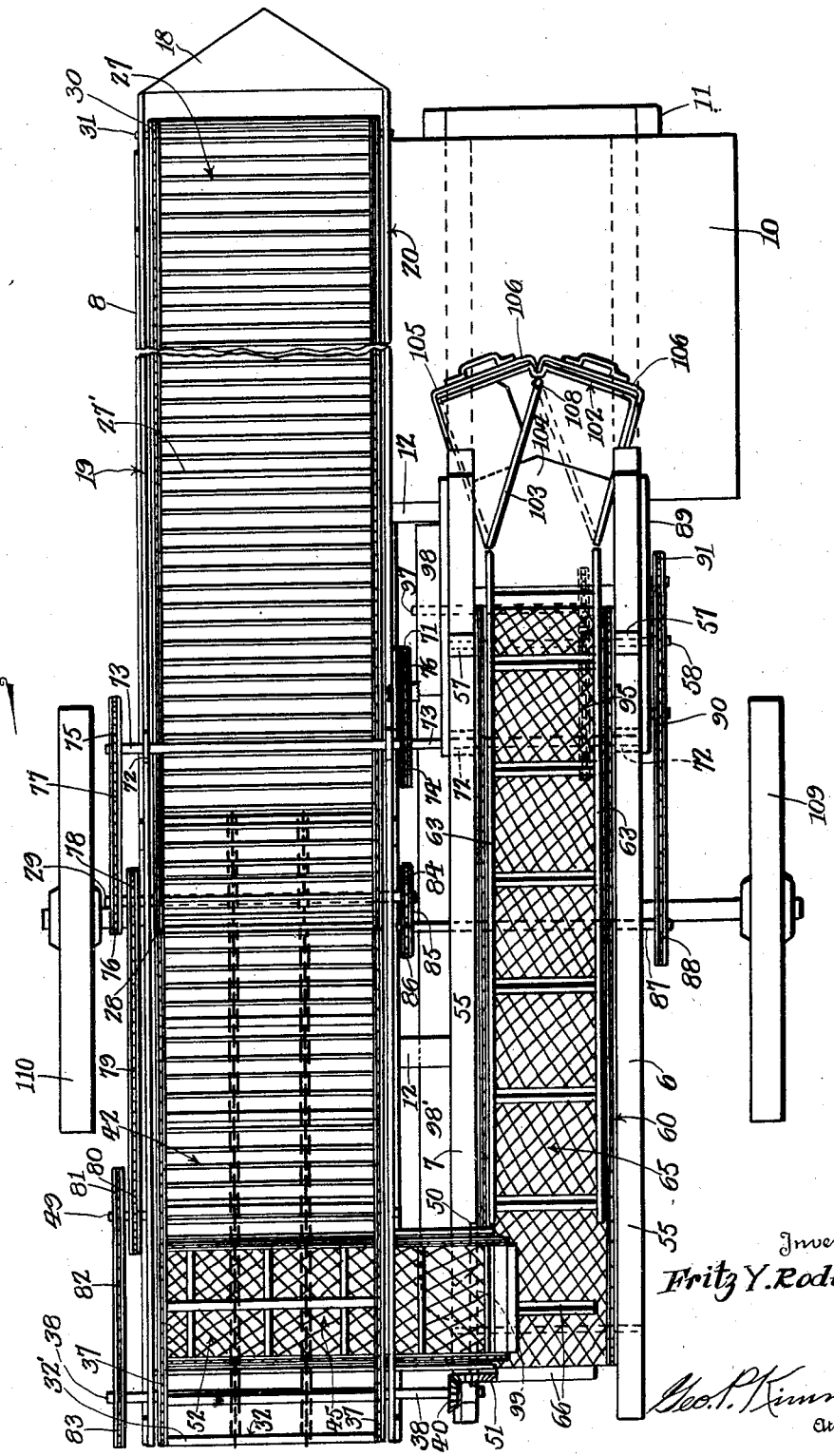

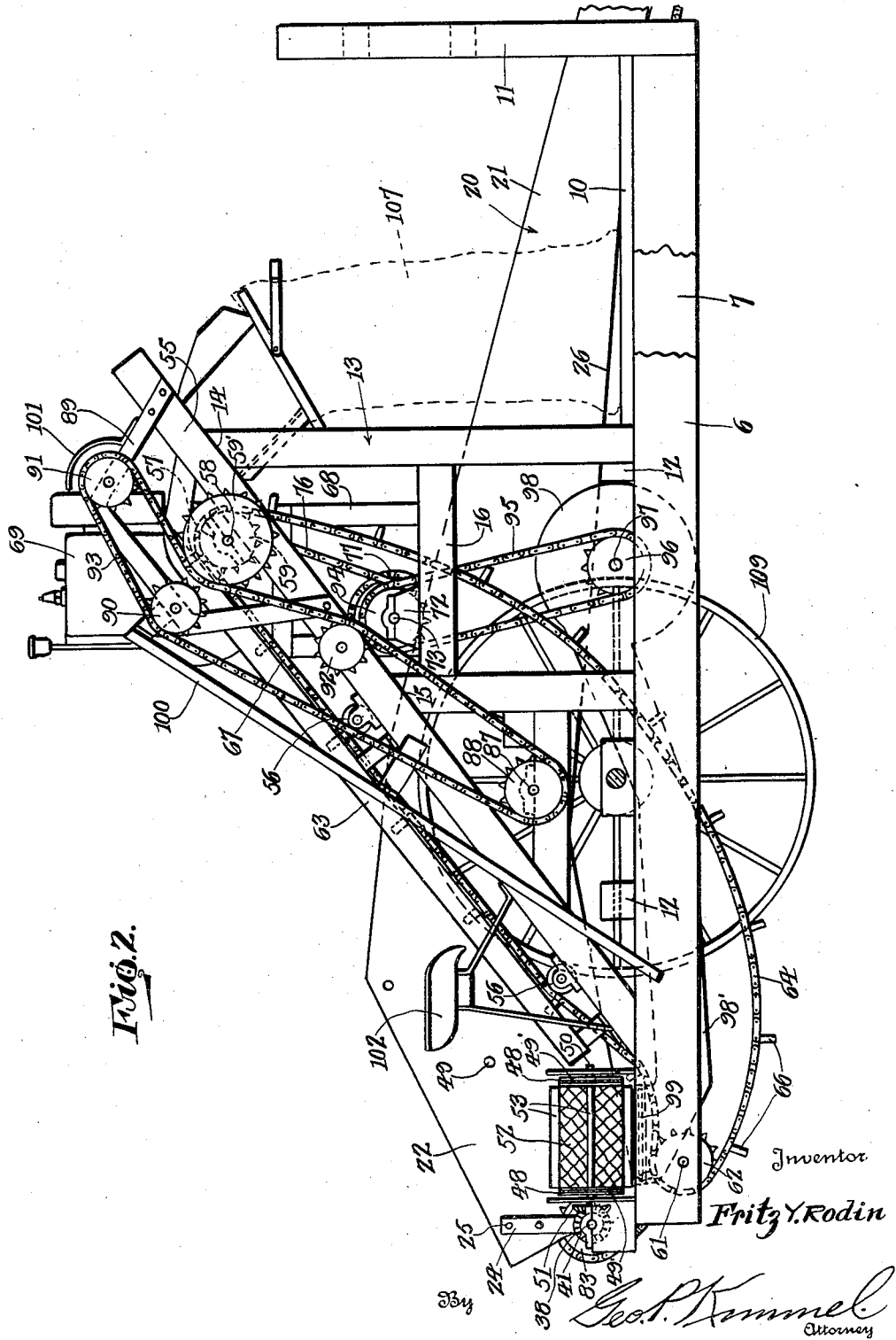

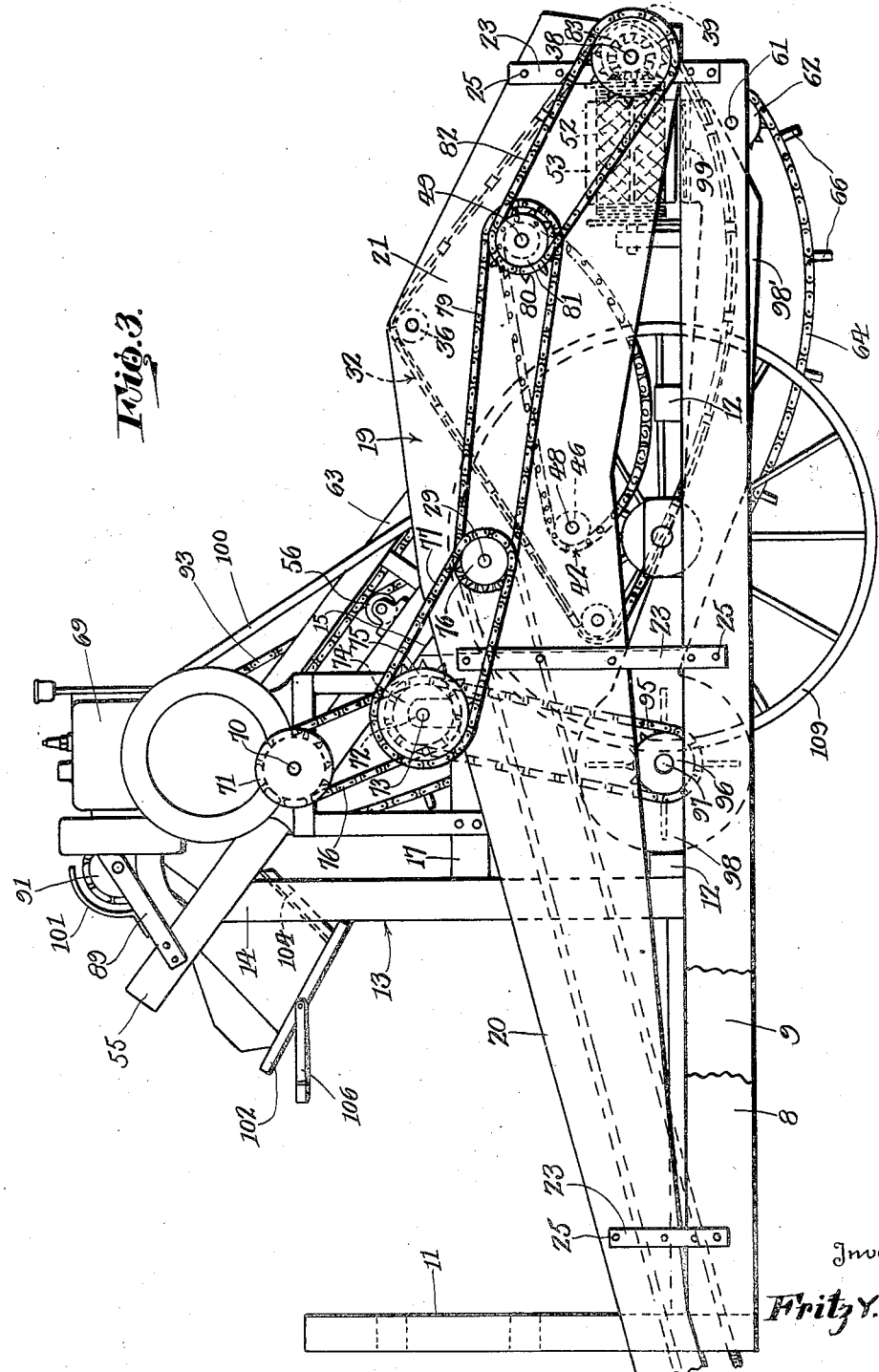

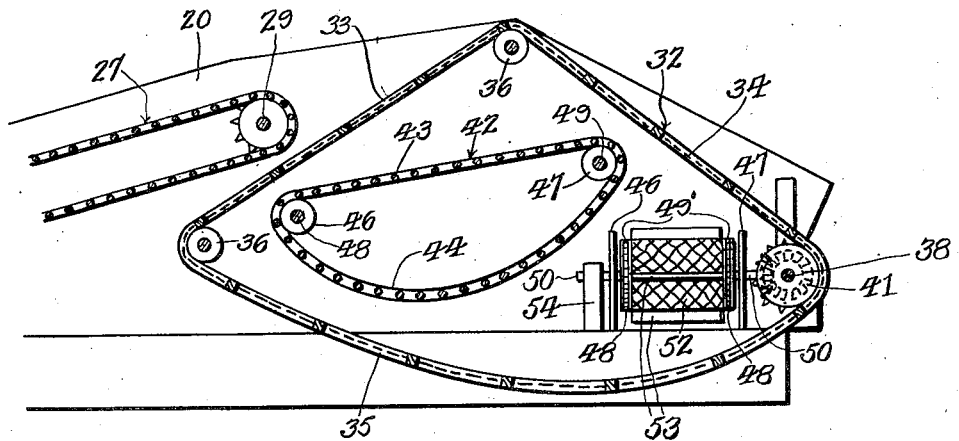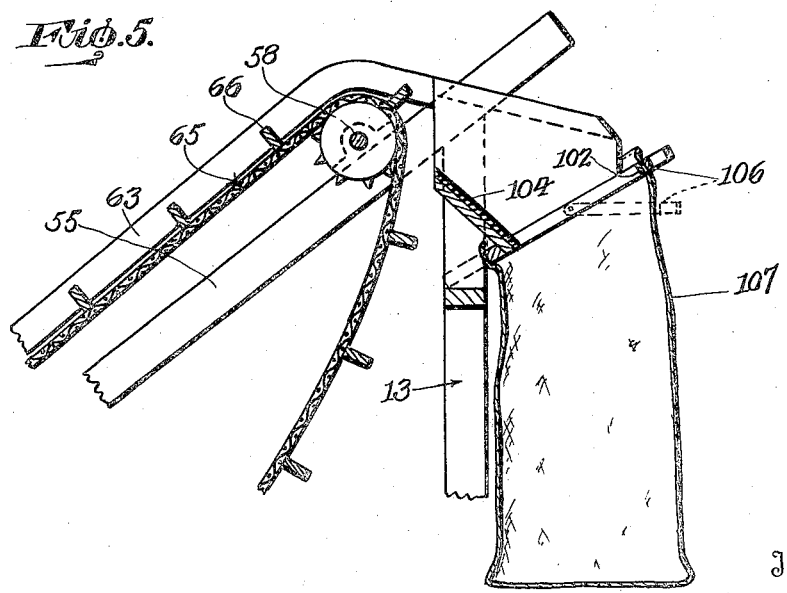

1,975,668

UNITED STATES PATENT OFFICE 1,975,668

POTATO HARVESTER

Fritz Yoakim Rodin, Chatham Center, N. Y.

Application October 7, 1933, Serial No. 692,648

6 Claims. (Cl. 55—51)

This invention relates to a mobile harvesting machine designed primarily for the harvesting of potatoes, but it is to be understood that a harvester, in accordance with this invention, may be employed in any connection for which it is found applicable, and the invention has for its object to provide, in a manner as hereinafter set forth, a mobile machine of the class referred to for digging or picking potatoes and conveying them to a point discharging into bags or containers; for separating weeds, vines or other foreign bodies from the potatoes during the conveying of the latter to the aforesaid point; for removing the weeds, vines, etc., from the machine prior to the potatoes reaching the aforesaid point, and for removing dirt, leaves and grass from the potatoes before they are discharged into the bags or containers.

A further object of the invention is to provide, a machine of the class referred to with means to enable the convenient removal of split or cut potatoes from a mass of potatoes during the conveying of the mass to a point of discharge.

A further object of the invention is to provide, a machine of the class referred to and in a manner as hereinafter set forth, with adjustable means at that end thereof where the potatoes are discharged for directing the travel of the potatoes from a filled bag or container to an empty bag or container.

Further objects of the invention are to provide, in a manner as hereinafter set forth, a mobile harvesting machine which is comparatively simple in its construction and arrangement, strong, durable, compact, thoroughly efficient in its use, readily assembled, conveniently repaired when occasion requires, and comparatively inexpensive to set up.

To the above ends essentially, and to others which may hereinafter appear, the invention consists of such parts, and such combination of parts which fall within the scope of the invention as claimed.

In the drawings:

Figure 1 is a top plan, broken away, of the machine, the seat used when discharging split or cut potatoes, the motor and the guard for one of the power transmitting elements not being shown.

Figure 2 is an elevation looking towards one side of the machine.

Figure 3 is a view similar to Figure 2 looking towards the other side of the machine.

Figure 4 is a detail in longitudinal section of the rear end of the machine.

Figure 5 is a view similar to Figure 4 of the front end of the machine.

The machine comprises a body portion of frame-like form including spaced parallel pairs of beams, each beam being oblong and of the desired length and width. Each beam stands on its lower lengthwise edge. The beams of each pair are arranged in parallel spaced relation. The beams of one pair are indicated at 6, 7 and those of the other pair at 8, 9. The beams 7, 9 are parallel and spaced from each other. Secured upon the front portions of the beams 6, 7 and 9 is a horizontally disposed platform 10. Attached to the front edge of platform 10 is a vertical retaining member 11 for filled bags or sacks. The pairs of beams are connected by the transverse cross members 12.

The body portion further includes an upstanding support 13 of frame-like form having its front of greater height than its rear. The lower end of the front of support 13 is anchored to the beams 6, 7 between the transverse median and forward end of said beams. The lower end of the rear of support 13 is anchored to the beams 6, 7 between the transverse median and rear end of said beams. The top of support 13 is open. The upper ends of the front and rear of support 13 are beveled as at 14, 15 respectively. The support 13 includes a pair of parallel spaced side or cross members 16, 17.

The machine includes a digger element 18 of any suitable form extended forwardly from the front end of the machine at that side of the latter opposite the side upon which platform 10 is positioned. The element 18 is suitably connected to the forward ends of a pair of spaced parallel elongated combined guard and supporting side cheeks 19, 20 which are positioned over the beams 8, 9 respectively. The cheeks 19, 20 extend forwardly and rearwardly with respect to beams 8, 9 and each is positioned upon it lower lengthwise edge. The cheeks are of like form and each includes a downwardly inclined forward portion 21 gradually decreasing in height towards and having its forward end connected to element 18. The portions 21 of the cheeks extend forwardly beyond the front ends of beams 8, 9. Each of the cheeks also includes a downwardly inclined rear portion 22 gradually decreasing in height towards the rear end of the cheek. The portions 22 of the cheeks extend rearwardly beyond the rear ends of beams 8, 9. The cheeks 19, 20 are anchored to the beams, 8, 9 respectively by sets 23, 24 respectively of vertically disposed spaced straps secured in position by holdfast devices 25. The forward portions 21 of the cheeks are of greater length than the rear portions 22 thereof. The cheeks 19, 20 have an intermediate stretch of the bottom edges thereof, as indicated at 26 spaced above the beams 8, 9 respectively.

Arranged between the portions 21 of the cheek is an elevator 27 in the form of an endless conveyor of the spaced slatted form leading upwardly at an inclination from the element 18, and operated at its rear from rotatable sprockets 28 carried by a driven shaft 29 journaled in the rear part of and extended from the portions 21 of the cheeks. The front of the elevator 27 travels around sprockets 30 on an idler shaft 31.

Positioned between the cheeks 19, 20 is a conveyor 32 of the form of a slatted endless element and with the slats of such element positioned a greater distance apart than the slats of elevator 27. The purpose of the conveyor 32 is to provide for the separation of the potatoes from the weeds and plants and for conveying the weeds and plants from off of the rear end of the machine. The slats of elevator 27 are indicated at 27' and the slats of conveyor 32 are indicated at 32'. The conveyor 32 includes a pair of oppositely inclined upper stretches 33, 34, the former leading upwardly from the inner or upper end of elevator 27 and the latter leading rearwardly downwardly from the upper end of stretch 33. The inner end of elevator 27 discharges upon the stretch 33 above the lower end of the latter. The inner or upper portion of elevator 27 overlaps the stretch 33. The stretches 33, 34 are connected together by a lower stretch 35. The conveyor 32 travels over rolls 36 supported from and arranged between the cheeks 19, 20. The conveyor 32 is operated from sprocket wheels 37 carried by a shaft 38 journaled in and extending laterally from the rear ends of the portions 22 of the cheeks. The shaft 38 at one end carries sprocket wheel 39 and at its other end a bevel pinion 40. The shaft 38 is also mounted in bearings 41 carried by beam 7. The conveyor 32 is termed a combined separating and conveyor element.

Arranged between the portions 22 of the cheeks 19, 20 and encompassed in spaced relation by the element 32 is a potato receiving and conveying element 42 in the form of a slatted endless member formed of an upper and a lower stretch 43, 44 respectively. The stretch 43 inclines upwardly from rear to front and overlaps and discharges at its rear end upon a transferring element 45 for the potatoes disposed at right angles to the element 42. The stretches 43, 44 travel around sprocket pinions 46, 47 carried by shafts 48, 49 respectively journaled in the cheeks 19, 20.

The element 45 includes spaced parallel side cheeks 46, 47 supported upon and transversely of the beams 7, 8 and 9, endless chains 48 traveling over sprockets 49' carried by a shaft 50 provided with a bevel gear 51 meshing with and operated from the bevel pinion 40. Connected to the chains 48 is a reticulated flexible endless apron 52 and arranged to oppose the outer face of the latter are spaced potato pushers 53 coupled thereto. The element 45 extends beyond beam 7 and partly spans the space between beams 6 and 7. A support 54 is provided for the inner end of shaft 50. The shaft 50 extends through the cheeks 46, 47 and these latter project above the upper stretches of chains 48.

Secured to the beams 6, 7 in proximity to the rear ends thereof is a pair of upstanding bars 55, which incline upwardly and forwardly from their lower ends. The bars 55 are anchored to the upper ends of the rear and front of the support 13 and at their upper ends extend forwardly from the latter. Mounted on the upper edges of the bars 55 at spaced intervals are idler rollers 56. Secured to the bars 55 in proximity to their upper ends are bearings 57 for a shaft 58 carrying parallel spaced sprocket wheels 59 for driving an elevator 60. The outer end of shaft 58 is provided with a sprocket wheel 59' of greater diameter than either of the sprocket wheels 59. Journaled in the beams 6, 7 in proximity to the rear ends thereof is a shaft 61 carrying sprocket wheels 62 for the elevator 60. Supported from the bars 55 are the side cheeks 63. The lower end of elevator 60 is arranged below that end of element 45 which partly spans the space between the beams 6, 7. The element 45 discharges the potatoes upon the lower end of elevator 60. The latter includes the side cheeks 63, a pair of endless chains 64 traveling over the sprocket wheels 59, 62, an endless reticulated flexible apron 65 and a series of spaced carriers 66 connected to and disposed transversely of apron 65. The elevator 60 includes an upper stretch 67 inclining upwardly and forwardly from the rear end of the elevator and traveling upon the idler rollers 56.

Extending from the support 13 is a stand 68 for supporting a motor 69 of the internal combustion type. A power take-off from the motor is designated 70 and which includes a sprocket wheel 71. Mounted in bearings 72 positioned on the cross members of the support 13 and the cheeks 19, 20 is a shaft 73 which projects outwardly from cheek 19. The shaft 73 intermediate its ends and adjacent cheek 20 is provided with a sprocket wheel 74. That end of shaft 73 adjacent cheek 19 carries a sprocket wheel 75. Leading from the sprocket wheel 71 to sprocket wheel 74 is an endless chain 76 for driving shaft 73. Leading from sprocket wheel 75 to a sprocket wheel 76 on the outer end of shaft 29 is an endless chain 77 for driving the latter. The shaft 29 adjacent sprocket 76 carries a sprocket 78 from which extends an endless chain 79 for driving a sprocket wheel 80 fixed to shaft 49. The outer end of shaft 49 carries a sprocket wheel 81 for driving an endless chain 82 which operates a sprocket wheel 83 fixed to shaft 38. The inner end of shaft 29 carries a sprocket wheel 84 for operating an endless chain 85 for the purpose of driving a sprocket wheel 86 fixed to the inner end of a shaft 87. The outer end of the latter carries a fixed sprocket wheel 88.

Secured to the upper portion of the outer bar 55 is an upstanding bracket 89 carrying at its top a pair of spaced idler sprocket pinions 90, 91. Adjustably connected to the outer side of the outer bar 55 is a sprocket pinion 92 for tensioning an endless chain 93 which travels around and is driven from sprocket 88. The chain 93 travels around pinion 91 and over pinion 90 and sprocket wheel 59. The chain 93 drives shaft 57 through sprocket wheel 59'.

The shaft 73 carries a sprocket wheel 94 for operating an endless chain 95 which leads to and operates a sprocket wheel 96 fixed to a blower operating shaft 97. The blower is indicated at 98 and is extended rearwardly as at 98' to a point below the element 45. The blower 98 has a discharge nozzle 99 arranged to direct the air through the discharge end of element 45 and across the lower portion of the elevator 60.

The blower functions to remove the dirt, grass and leaves from the potatoes as they are deposited upon the bottom of elevator 60.

A guard 100 is arranged with respect to chain 93. A guard 101 is provided for sprocket pinion 91. A seat 102 is connected to the bars 55 in proximity to the lower portion of elevator 60 and which enables one to be seated in a position for the convenient removal of slit and cut potatoes manually.

Connected to the top of the support 13 and extending forwardly therefrom is an inclined chute structure 102 for conducting the potatoes when passing off of the top of elevator 60 into a bag or container. The structure 102 includes a pivoted directing member 103 providing for guiding the potatoes to a single bag. The bottom 104 of structure 102 is flared and carries a pair of independently shiftable pivoted clamping members 105, 106 functioning to releasably clamp a pair of bags or sacks 107 in open mouth position to bottom 104. The member 103 is pivoted at its outer end, as at 108 and stands on one of its lengthwise edges. When one bag is filled, the member 103 is shifted from full lines to dotted line position, Figure 1, whereby the potatoes will be directed to the non-filled bag.

Supporting wheels 109, 110 are provided for the body portion of the machine. The separating and conveying element 32 extends transversely over and rearwardly from the element 45. The cheeks 19, 20 prevent the potatoes, vines and weeds from passing laterally off elements 27, 32 and 42. The cheeks 46, 47 prevent the potatoes passing laterally off the element 45 and the cheeks 63 perform a like function with respect to element or elevator 60.

On the operation of the motor 69, take-off 70 will be driven and owing to the operative drive connections 76 and 82 with respect to the driving connections for the elements 27, 32, 42, 45 and 60 the said elements will operate synchronously. The elevator 27 provides for conducting the potatoes, weeds, vines, grass and leaves upwardly from the digger element 18 and discharging the mass upon the combined separator and conveyor element 32. The weeds and vines are conducted off of the machine at the rear of the latter by element 32, but the potatoes fall through the latter and are deposited upon conveyor element 43 which conveys and discharges them upon the transferring element 45, the latter conducts the potatoes and deposits them upon the lower portion of elevator 60. The latter provides for conducting the potatoes upwardly and discharges them into the chute structure 102 which delivers the potatoes to the bags or sacks. A person stands upon the platform 10 for the purpose of removing a filled bag or sack, positioning an empty bag or sack in position to be filled and for adjusting member 103 when required. The empty bags or sacks are piled upon platform 10.

What I claim is:—

1. A mobile potato harvesting machine comprising an elevator element for elevating potatoes, vines and weeds from a digger, a combined separator and conveyor element for receiving the potatoes, weeds and vines from the upper end of the elevator element and for separating the potatoes from the weeds and vines and for the conveying off of the latter from off the machine at its rear, a potato conveying element encompassed in spaced relation by and receiving the potatoes from said combined separator and conveyor element, a potato transferring element disposed at right angles to and arranged below the rear portion of the combined separator and conveyor element and arranged below and receiving the separated potatoes from the potato conveying element, a second elevator element arranged adjacent said combined separator and conveyor element and having its lower end arranged below and partly covered by the discharge end of said transferring element for receiving potatoes from the latter, a conducting off chute structure at the upper end of said second elevator element for receiving the potatoes from the latter, supporting means for said elements and chute structure, a blower element on said supporting means and having its discharge end arranged to discharge air through the discharge end of the transferring element and across the lower end of said second elevating element, and means for synchronously operating the said elements.

2. A mobile potato harvesting machine comprising an elevator element for elevating potatoes, vines and weeds from a digger, a combined separator and conveyor element for receiving the potatoes, weeds and vines from the upper end of the elevator element and for separating the potatoes from the weeds and vines and for the conveying off of the latter from off the machine at its rear, a potato conveying element encompassed in spaced relation by and receiving the potatoes from said combined separator and conveyor element, a potato transferring element disposed at right angles to and arranged below the rear portion of the combined separator and conveyor element and arranged below and receiving the separated potatoes from the potato conveying element, a second elevator element arranged adjacent said combined separator and conveyor element and having its lower end arranged below and partly covered by the discharge end of said transferring element for receiving potatoes from the latter, a conducting off chute structure at the upper end of said second elevator element for receiving the potatoes from the latter, supporting means for said elements and chute structure, a blower element on said supporting means and having its discharge end arranged to discharge air through the discharge end of the transferring element and across the lower end of said second elevating element, means for synchronously operating the said elements, and a seat positioned rearwardly of said second elevator element for the use of a person when removing split and cut potatoes from off of the second elevator.

3. A mobile potato harvesting machine comprising an elevator element for elevating potatoes, vines and weeds from a digger, a combined separator and conveyor element for receiving the potatoes, weeds and vines from the upper end of the elevator element and for separating the potatoes from the weeds and vines and for the conveying off of the latter from off the machine at its rear, a potato conveying element encompassed in spaced relation by and receiving the potatoes from said combined separator and conveyor element, a potato transferring element disposed at right angles to and arranged below the rear portion of the combined separator and conveyor element and arranged below and receiving the separated potatoes from the potato conveying element, a second elevator element arranged adjacent said combined separator and conveyor element and having its lower end arranged below and partly covered by the discharge end of said transferring element for receiving potatoes from the latter, a conducting off chute structure at the upper end of said second elevator element for receiving the potatoes from the latter, supporting means for said elements and chute structure, a blower element on said supporting means and having its discharge end arranged to discharge air through the discharge end of the transferring element and across the lower end of said second elevating element, means for synchronously operating the said elements, a platform on said supporting means and below said chute structure, and the latter being provided with means for detachably connecting a pair of open mouth sacks thereto and for selectively guiding the potatoes to one of said sacks.

4. A mobile potato harvesting machine comprising an elevator element for elevating potatoes, vines and weeds from a digger, a combined separator and conveyor element for receiving the potatoes, weeds and vines from the upper end of the elevator element and for separating the potatoes from the weeds and vines and for the conveying off of the latter from off the machine at its rear, a potato conveying element encompassed in spaced relation by and receiving the potatoes from said combined separator and conveyor element, a potato transferring element disposed at right angles to and arranged below the rear portion of the combined separator and conveyor element and arranged below and receiving the separated potatoes from the potato conveying element, a second elevator element arranged adjacent said combined separator and conveyor element and having its lower end arranged below and partly covered by the discharge end of said transferring element for receiving potatoes from the latter, a conducting off chute structure at the upper end of said second elevator element for receiving the potatoes from the latter, a supporting means for said elements and chute structure, a blower element on said supporting means and having its discharge end arranged to discharge air through the discharge end of the transferring element and across the lower end of said second elevating element, means for synchronously operating the said elements, a seat positioned rearwardly of said second elevator element for the use of a person when removing split and cut potatoes from off of the second elevator, a platform on said supporting means and below said chute structure, and the latter being provided with means for detachably connecting a pair of open mouth sacks thereto and for selectively guiding the potatoes to one of said sacks.

5. In a mobile potato harvesting machine, an upwardly inclined elevating means for conveying weeds, vines and potatoes in a rearward direction upwardly from the front of the machine, a combined separating and conveying element for receiving the weeds, vines and potatoes from said elevating means for separating the potatoes from the weeds and vines and carrying off the weeds and vines independently of the potatoes, a potato conveying element completely encompassed by said combined separating and conveying element, the said latter element having means provided with provisions for the passage therethrough of the separated potatoes to said potato conveying element, a transferring element for receiving the potatoes from said potato conveying element, an upwardly inclined elevating element extending in an opposite direction with respect to said means for receiving upon its lower portion the potatoes from said transferring element, a potato carrying off and bag positioning structure coacting with the upper end of said potato elevating element, means for operating the said element and elevating means, a blower element coacting with said potato transferring and elevating elements, and supporting means for said elements, elevating means and structure.

6. In a mobile potato harvesting machine, an upwardly inclined elevating means for conveying weeds, vines and potatoes in a rearward direction upwardly from the front of the machine, a combined separating and conveying element for receiving the weeds, vines and potatoes from said elevating means for separating the potatoes from the weeds and vines and carrying off the weeds and vines independently of the potatoes, a potato conveying element completely encompassed by said combined separating and conveying element, the said latter element having means provided with provisions for the passage therethrough of the separated potatoes to said potato conveying element, a transferring element for receiving the potatoes from said potato conveying element, an upwardly inclined elevating element extending in an opposite direction with respect to said means for receiving upon its lower portion the potatoes from said transferring element, a potato carrying off and bag positioning structure coacting with the upper end of said potato elevating element, means for operating the said element and elevating means, a blower element coacting with said potato transferring and elevating elements, supporting means for said elements, elevating means and structure, and a platform on said supporting means arranged at one side of said elevating means, below said structure and forwardly of said potato elevating structure.

FRITZ YOAKIM RODIN.